United States Patent [19]

Kassai

[11] Patent Number: 4,674,761
[45] Date of Patent: Jun. 23, 1987

[54] CHILDS TRICYCLE

[75] Inventor: Kenzou Kassai, Osaka, Japan

[73] Assignee: Aprica Kassai Kabushikikaisha, Osaka, Japan

[21] Appl. No.: 832,849

[22] Filed: Feb. 24, 1986

[30] Foreign Application Priority Data

Apr. 3, 1985 [JP] Japan .................. 60-49613[U]

[51] Int. Cl.⁴ .............................................. B62K 5/02
[52] U.S. Cl. .................................. 280/271; 280/272; 280/289 R
[58] Field of Search ............... 280/282, 239, 271, 272, 280/89, 92, 289 H, 289 R, 293

[56] References Cited

FOREIGN PATENT DOCUMENTS

| 61930 | 2/1944 | Denmark | 280/272 |
| 2903818 | 8/1980 | Fed. Rep. of Germany | 280/293 |
| 61586 | 10/1939 | Norway | 280/89 |
| 176187 | 6/1935 | Switzerland | 280/272 |

Primary Examiner—John J. Love
Assistant Examiner—Eric D. Culbreth
Attorney, Agent, or Firm—W. G. Fasse; D. H. Kane, Jr.

[57] ABSTRACT

A child's tricycle includes a slider (17) and a locking member (30) engageable by the slider at one end of the path of travel of the slider in order to selectively inhibit the turning movement relative to a vehicle body (3) of a handle assembly (6) holding a front wheel (4). The slider is slidably held by a guide member (11) which is provided on one of the elements, the vehicle body and the handle assembly, while the locking member is provided on the other element. The tricycle also includes a spring (25) for urging the slider to fit in the locking member and an engaging structure (12, 20) for holding the slider against the force of the spring at a position where it does not fit in the locking member. When the turning movement of the handle assembly is inhibited, the direction of the front wheel relative to the vehicle body is fixed, which means that when the tricycle is pushed from behind, the direction of travel of the tricycle is fixed, so that the tricycle can be easily pushed forward.

6 Claims, 7 Drawing Figures

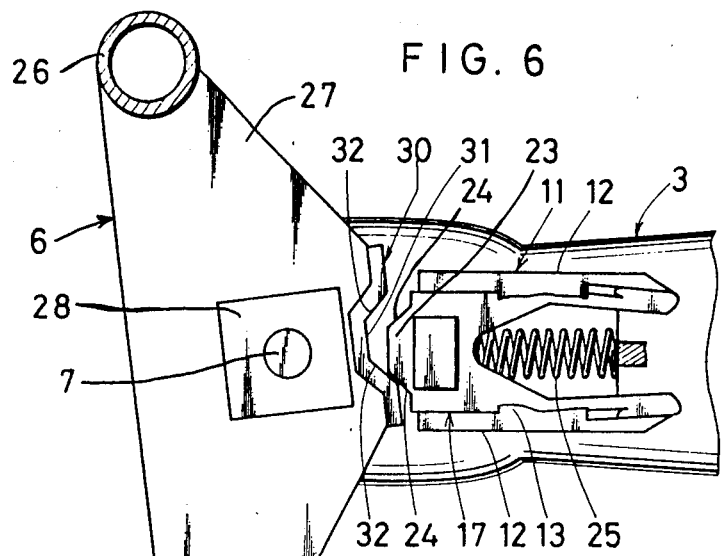
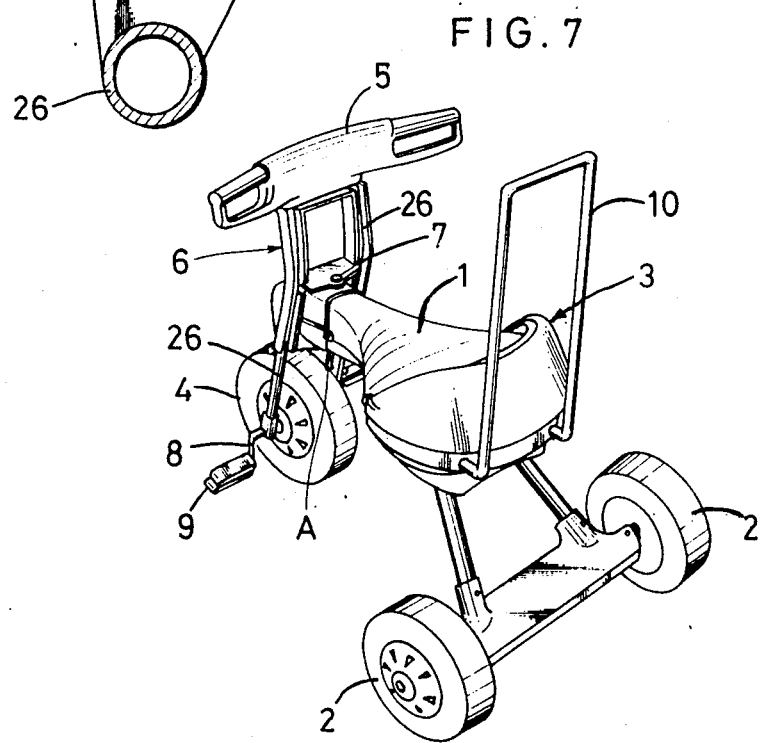

CHILDS TRICYCLE

BACKGROUND OF THE INVENTION

This invention relates to a child's tricycle and particularly to a construction for selectively inhibiting the steering action of the front wheel of a child's tricycle.

A typical child's tricycle, as shown in FIG. 7, is constructed so that a handle assembly 6 having a single front wheel 4 and a handle 5, is pivotally mounted on a vehicle body 3 having a saddle 1 and two rear wheels 2, said handle assembly being rotatable around the axis of a steering shaft 7. The front wheel 4 has pedals 9 attached thereto through a crank shaft 8. Usually, a child, sitting on the saddle 1, enjoys a ride on this tricycle with his feet placed on the pedals 9 to drive the front wheel 4 and with his hands gripping the handle 5 for steering.

Further, as shown in FIG. 7, a tricycle is provided with a novel manual push handle 10 at a suitable level on the vehicle body 3 for pushing the tricycle forward from behind through the push handle 10 which extends substantially upwardly from the saddle.

When attention is given to the handle assembly 6, particularly to the steerable arrangement of the front wheel 4, it is seen that this function, which is necessary when a child is riding on the tricycle by driving the pedals 9, is more obstructive than useful when the child pushes the tricycle from behind through the push handle 10. The reason is that in the case where the tricycle is pushed from behind, with the hands not reaching the steering handle 5 the front wheel 4 will be directed away from the course of movement of the tricycle. Therefore, the way of play in which the tricycle is pushed from behind, is virtually impossible unless one child rides on the tricycle and another pushes it from behind.

SUMMARY OF THE INVENTION

Accordingly, this invention is intended to provide a child's tricycle wherein the handle assembly including the front wheel and the steering handle can be selectively fixed to the vehicle body to establish a state which prevents the handle assembly from turning around the axis of the steering shaft.

According to the invention there is provided a child's tricycle wherein a handle assembly comprising single front wheel and a steering handle, is pivotally mounted on a vehicle body having a saddle and two rear wheels, said handle assembly being turnable around the axis of a steering shaft, said child's tricycle being characterized by a slider and a locking member engageable by said slider at one end of the path of travel of said slider in order to selectively inhibit the rotation of the handle assembly relative to the vehicle body, said slider being slidably held by a guide member installed on one of the elements, namely the vehicle body or the handle assembly, said locking member being installed on the other element, said tricycle further including a spring for urging the slider to fit into said locking member, and engaging means for holding the slider against the force of the spring at a position where it cannot fit into the locking member.

In this invention, when the slider fits in the locking member under the force of the spring, the rotation of the handle assembly relative to the vehicle body is inhibited. Therefore, the front wheel has its direction relative to the vehicle body fixed, so that when the tricycle is pushed from behind, the direction of travel of the tricycle is fixed to establish a state which facilitates the pushing of the tricycle. Further, by moving the slider against the force of the spring to a position where it does not fit into the locking assembly, and maintaining it in said position, there is obtained a state which allows free rotation of the handle assembly around the axis of the steering shaft for normally riding the tricycle. Therefore, the usual way of playing in which the child rides on the tricycle and moves the latter by driving the pedals is also possible.

Further, according to this invention, since the slider is urged by the spring to fit into the locking assembly, the operation for locking can be attained by simply canceling the engaged state established by the engaging means.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a view showing a state which is established in the state of FIG. 4 when there is a sufficiently severe shock to cause the handle assembly to turn; and FIG. 7 is a view of an example of a conventional child's tricycle to which the invention is applicable.

DESCRIPTION OF THE PREFERRED EMBODIMENTS

An embodiment of the invention to be described below is applicable to a child's tricycle shown in FIG. 7.

Figure 1:
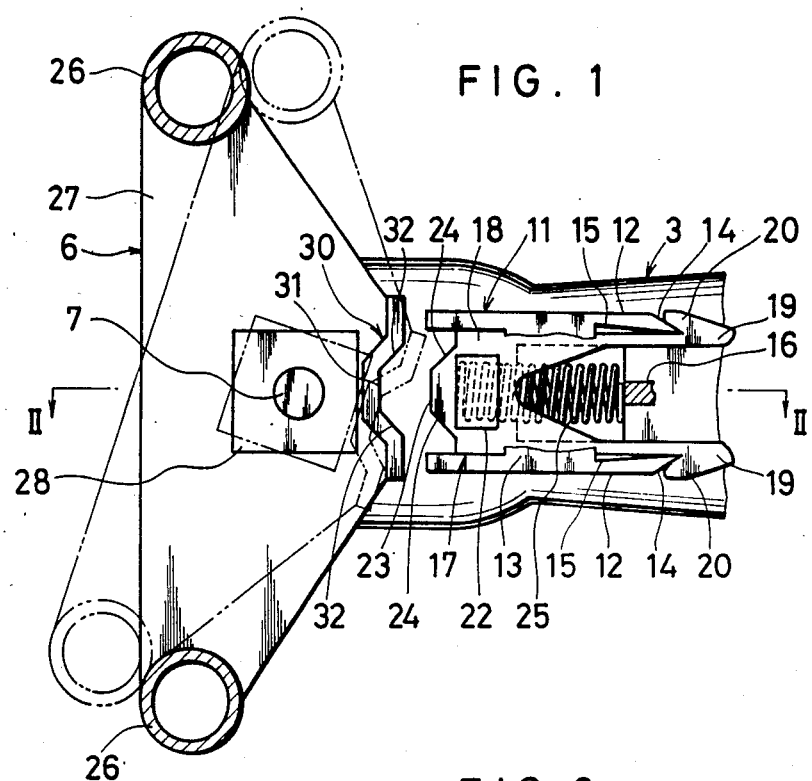
FIG. 1 is a bottom view of a child's tricycle according to an embodiment of the invention, showing a handle assembly in its rotatable state.
Figure 2:
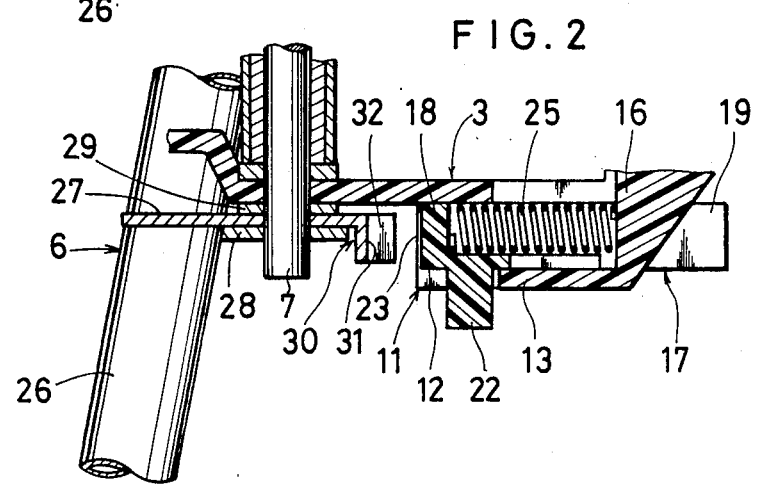
FIG. 2 is a sectional view taken along the line II—II in FIG. 1.
Figure 3:
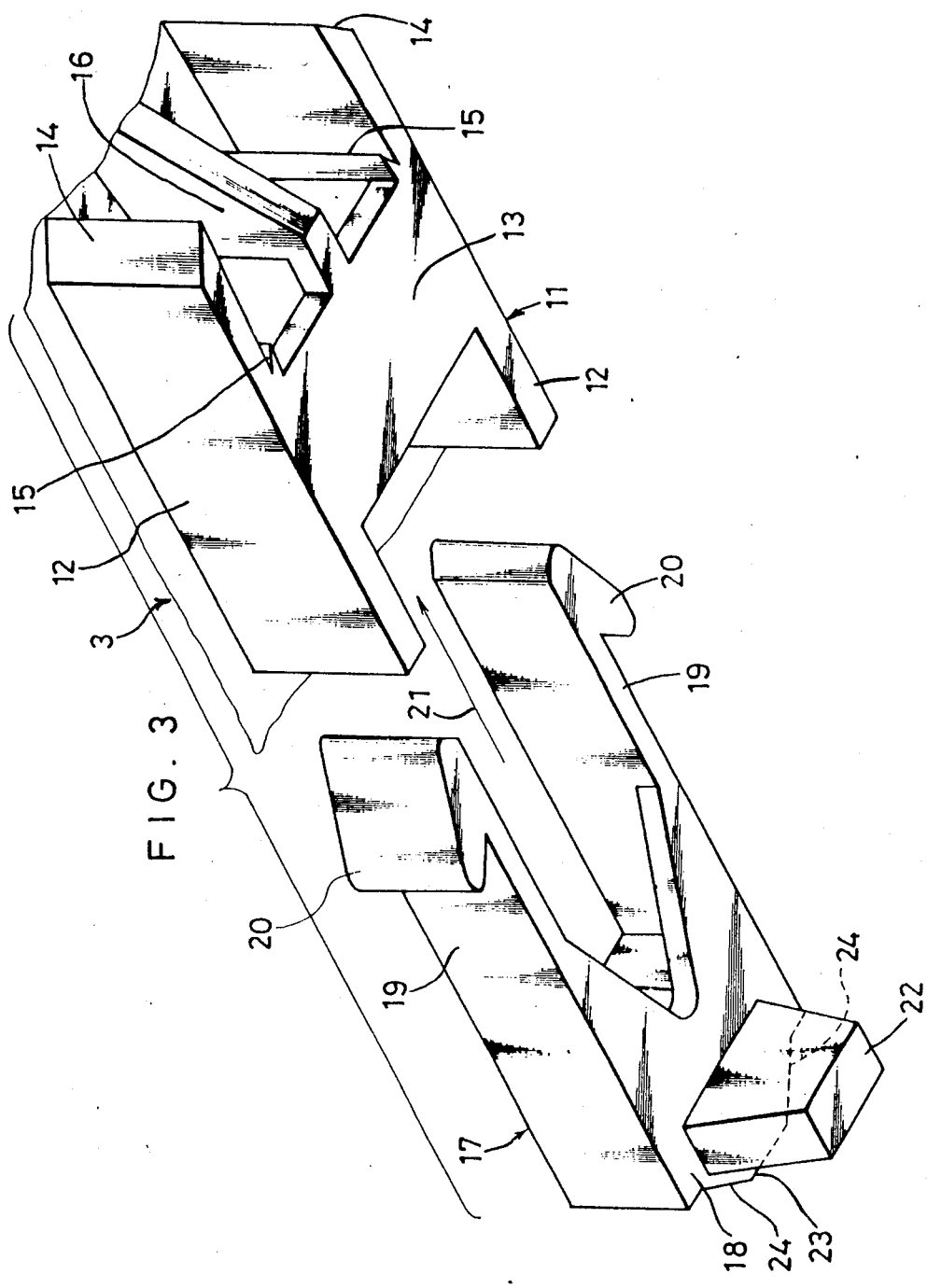
FIG. 3 is a perspective view, exploded and taken from below, of a guide member and a slider shown in FIGS. 1 and 2.

FIGS. 1 and 2 show a state which allows the handle assembly 6 to turn relative to the vehicle body 3 around the axis of the steering shaft 7. The vehicle body 3 made, for example of rigid plastic material, has a guide member 11 installed on the bottom surface thereof. The guide member 11 is shown in a perspective view in FIG. 3 taken from below. The guide member 11 has a pair of parallel lateral walls 12. The lower ends of the parallel lateral walls 12 are connected together by a connecting wall 13. One free end of each lateral wall 12 is formed with a slope 14 forming a knife edge. Further, the inward surface of each lateral wall 12 which extends from the root of the connecting wall 13 to one free end of the lateral wall 12, is an inclined surface.

A spring receiver 16 extending integrally from the connecting wall 13 of the guide member 11 is positioned substantially intermediate between the pair of lateral walls 12.

A slider 17 is slidably held by the guide member 11. The slider 17 is made of solid plastic material having a suitable degree of elasticity and is formed as a U shape having a base 18 and two legs 19 extending parallel to each other in the same direction. In such an arrangement, the legs 19 are elastically movable toward each other. The open end of each leg 19 has an outwardly projecting engaging portion 20. The slider 17 is inserted into the guide member 11 in the direction of arrow 21 from the state of FIG. 3. The slider 17, surrounded by the lateral walls 12 and connecting wall 13, is slidably held for movement in the direction in which the lateral walls 12 extend. The base 18 of the slider 17 has an operating knob 22 extending downwardly. Further, one end of the slider 17, as viewed in the direction of its travel, has a raised portion 23 flanked with tapered surfaces 24.

A spring 25 is provided for urging the slider 17 leftward as viewed in FIGS. 1 and 2. The spring 25 is, for example, a compression spring, disposed between the two legs 19 of the slider 17. In this case, one end of the spring 25 abuts against the aforesaid spring receiver 16 and the other end abuts against the base 18 of the slider 17.

The arrangement of the handle assembly 6 will now be described.

As shown in FIG. 7, the handle assembly 6 includes two pipes 26 supporting the axle of the front wheel 4 and holding the steering shaft 7 therebetween. These pipes 26 are also shown in FIGS. 1, 2, 4, 5 and 6. As shown in these figures, a fixing plate 27 is secured to the pipes 26 so as to connect the two pipes 26. The steering shaft 7 extends through said fixing plate 27. The lower end of the steering shaft 7 has a washer 28 fixed thereto for holding the steering shaft 7 so that it will not slip upwardly. A downward slip of the steering shaft 7 can be prevented by an enlarged upper end of the steering shaft 7. The vehicle body 3 is placed on the fixing plate 7 with a washer 29 interposed therebetween. In this manner, the vehicle body 3 holds the handle assembly 6 for turning movement around the axis of the steering shaft 7.

The rear end of said fixing plate 27 is provided with a locking member 30. In this embodiment, the locking member 30 is integral with the fixing plate 27. The locking member 30 has a recess 31 which is flanked with tapered surfaces 32.

A description will now be given of how to lock the handle assembly 6 of the above-described child's tricycle against a turning movement and how to cancel the locking.

The unlocked or rotatable state shown in FIGS. 1 and 2 is one which allows the handle assembly 6 to turn around the axis of the steering shaft 7. In this unlocked state, the slider 17 has been moved rightwardly as viewed in FIGS. 1 and 2 against the force of the spring 25. This unlocked state is maintained by the engaging portions 20 of the slider 17 engaging the terminal ends of the lateral walls 12 of the guide member 11. As shown in phantom lines in FIG. 1, the handle assembly 6 is turnable around the axis of the steering shaft 7. In addition, usually, the handle assembly 6 of the child's tricycle is limited in its range of turning movement to a relatively narrow one, e.g., 70 degrees, for safety. Thus, in FIG. 1, the fixing plate 27 is prevented from further turning when it abuts against the guide member 11.

Figure 4:
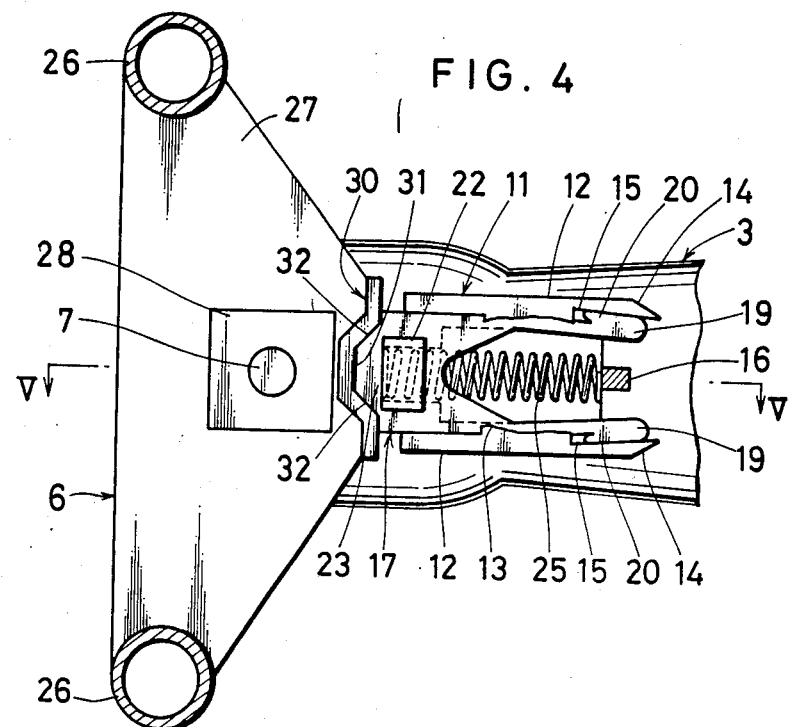
FIG. 4 is a bottom view of the same portion as in FIG. 1, showing a locked state which inhibits the rotation of the handle assembly.
Figure 5:
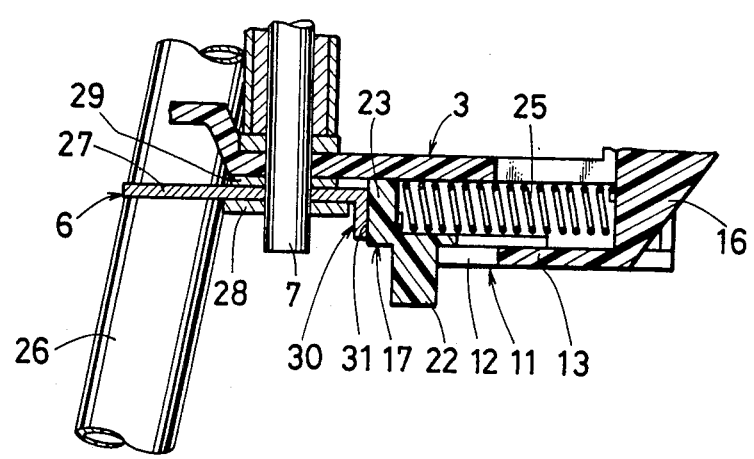
FIG. 5 is a sectional view taken along the line V—V in FIG. 4.

FIGS. 4 and 5 show a locked state which inhibits the handle assembly 6 from turning around the axis of the steering shaft 7. To obtain this locked state, it is only necessary to operate the open ends of the legs 19 of the slider 17 in the state of FIG. 1 to move them toward each other. During this operation, the slopes 14 guide the engaging portions 20 until the latter are disengaged from the terminal ends of the lateral walls 12. At the same time, the slider 17 is caused to fit into the locking member 30, as shown in FIGS. 4 and 5, by the action of the spring 25, whereby the raised portion 23 of the slider 17 is inserted into the recess 31 of the locking member 30.

To change the locked state shown in FIGS. 4 and 5 back into the unlocked state shown in FIGS. 1 and 2, the operating knob 22 is manipulated to slide the slider 17 rightwardly as viewed in the figures against the force of the spring 25. In addition, in the locked state shown in FIGS. 4 and 5, the legs 19 of the slider 17 are held between the lateral walls 12 of the guide member 11 as they are elastically slightly inwardly displaced. Therefore, when the slider 17 is moved to the right as described above, the engaging portions 20 are moved along the inclined surfaces 15 until they leave the latter, whereupon they engage the terminal ends of the lateral walls 12. At this time, the slider 17 slightly moves leftward under the action of the spring 25, with the result that, as shown in FIGS. 1 and 2, the engaging portions 20 intimately engage the terminal ends of the lateral walls 12.

This embodiment is so arranged that in the locked state of the handle assembly 6 shown in FIGS. 4 and 5, a severe shock applied to the front wheel 4 automatically cancels the locked state. That is, if a severe shock is applied to the front wheel 4, the force is applied to the handle assembly 6 to cause the latter to change the direction of travel of the front wheel 4. Therefore, the handle assembly 6 is biased with respect to the vehicle body 3. As a result, the taper surfaces 24 formed on both sides of the raised portion 23 and the taper surfaces 32 formed on both sides of the recess 31 guide each other, causing the slider 17 to move rightwardly against the force of the spring 25. In this manner, the handle assembly 6 is allowed to turn relative to the vehicle body 3 around the axis of the steering shaft 7 when a severe shock is applied to the front wheel 4. This is advantageous in preventing damage to the mechanism including the slider 17 and locking member 30.

In the illustrated embodiment described above, the raised portion 23 has been provided on the slider 17 and the recess 31 has been provided in the locking member 30; however, reversely, the recess may be provided in the slider and the raised portion on the locking member. Further, if the advantage shown in FIG. 6 is not desired, the tapered surfaces 24 and 32 on the raised portion 23 and recess 31 are not necessary.

Further, the slider 17 and guide member 11 have been provided on the vehicle body 3 and the locking member 30 has been provided on the handle assembly 6; however, reversely, the slider and guide member may be provided on the handle assembly and the locking member may be provided on the vehicle body.

Although the present invention has been described and illustrated in detail, it is clearly understood that the same is by way of illustration and example only and is not to be taken by way of limitation, the scope of the present invention being limited only by the terms of the appended claims.

What is claimed is:

1. A child's tricycle wherein a handle assembly (6) having a single front wheel (4) and a handle (5) is pivotally mounted on a vehicle body (3) having a saddle (1) and two rear wheels (2), said handle assembly being turnable around the axis of a steering shaft (7), comprising a slider (17) and a locking member (30) engageable by said slider at one end of the path of travel of said slider for selectively inhibiting the rotation of said handle assembly relative to said vehicle body, said slider being slidably held by a guide member (11) installed on one of the vehicle body and the handle assembly, said locking member being installed on the other of said vehicle body and said handle assembly, a spring (25) for urging said slider (17) to fit into said locking member, engaging means (12, 20) for holding said slider (17) against the force of said spring at a position where said slider cannot fit into said locking member, wherein said slider (17) has a U-shape made of elastic material, said U-shape having a base (18) and two legs (19) extending from said base parallel to each other in the same direction, each of said two legs having a free end, said engaging means including an engaging portion (20) projecting outwardly from each free leg end, said guide member having a pair of parallel lateral walls (12) which hold said two legs therebetween on the outside, and wherein said engaging portions engage terminal ends of said lateral walls.

2. The child's tricycle of claim 1, wherein said spring is a compression spring (25) disposed between the two legs (19) of said slider, said tricycle further comprising a spring receiver (16) for receiving one end of said spring, said spring receiver being formed between the pair of said lateral walls (12) of said guide member, and wherein another end of said spring abuts against a base (18) of said slider.

3. The child's tricycle of claim 1, wherein a portion of said slider fitting into said locking member is in the form of a raised portion (23), and wherein said locking member has a recess (31).

4. The child's tricycle of claim 3, wherein said raised portion of said slider is flanked with tapered surfaces (24), and wherein said recess of said locking member is flanked with tapered surfaces (32).

5. The child's tricycle of claim 1, wherein said slider is provided with an operating knob (22).

6. The child's tricycle of claim 1, further including a manual push handle (10) having the shape of an inverted U-bail attached in the back of said saddle.

* * * * *